United States Patent
Galligan et al.

(10) Patent No.: US 7,521,033 B2
(45) Date of Patent: Apr. 21, 2009

(54) EXHAUST INLET METALLIC FOAM TRAP COUPLED TO A DOWNSTREAM MONOLITHIC PRECIOUS METAL CATALYST

(75) Inventors: Michael Patrick Galligan, Cranford, NJ (US); Joseph Charles Dettling, Howell, NJ (US)

(73) Assignee: BASF Catalysts LLC, Florham Park, NJ (US)

( * ) Notice: Subject to any disclaimer, the term of this patent is extended or adjusted under 35 U.S.C. 154(b) by 368 days.

(21) Appl. No.: 11/316,594

(22) Filed: Dec. 22, 2005

(65) Prior Publication Data

US 2007/0160518 A1   Jul. 12, 2007

(51) Int. Cl.
*B01D 53/74* (2006.01)
*B01D 53/75* (2006.01)
*B01D 53/86* (2006.01)
*B01D 53/94* (2006.01)

(52) U.S. Cl. .......... 423/210; 423/247; 423/245.3; 423/239.1; 423/244.01; 423/244.09; 423/244.1; 423/215.5; 423/213.2; 423/213.5; 423/213.7; 422/168; 422/169; 422/170; 422/171; 422/177; 422/180; 422/181

(58) Field of Classification Search .......... 423/210, 423/247, 245.3, 239.1, 244.01, 244.09, 244.1, 423/215.5, 213.2, 213.5, 213.7; 422/168, 422/169, 170, 171, 177, 180, 181
See application file for complete search history.

(56) References Cited

U.S. PATENT DOCUMENTS

| | | |
|---|---|---|
| 3,111,396 A | 11/1963 | Ball |
| 4,027,367 A | 6/1977 | Rondeau |
| 4,335,023 A | 6/1982 | Dettling et al. |
| 4,414,023 A | 11/1983 | Aggen et al. |
| 4,420,316 A | 12/1983 | Frost et al. |
| 4,535,588 A * | 8/1985 | Sato et al. ............ 60/286 |
| 4,671,931 A | 6/1987 | Herchenroeder et al. |
| 4,674,447 A | 6/1987 | Davis |
| 4,774,217 A | 9/1988 | Takeuchi et al. |
| 4,813,231 A | 3/1989 | Bykowski |

(Continued)

FOREIGN PATENT DOCUMENTS

DE   3729126 A1   4/1989

(Continued)

OTHER PUBLICATIONS

U.S. Appl. No. 11/321,254, "Metallic Foam Trap for Poisons: Aircraft Ozone", Galligan, et al., Dec. 29, 2005.

(Continued)

*Primary Examiner*—Timothy C Vanoy
(74) *Attorney, Agent, or Firm*—Bronwen M. Loeb; Drinker Biddle & Reath; Melanie L. Brown

(57) ABSTRACT

The present invention is directed to an improved apparatus and method of minimizing catalyst poisoning from exhaust gas streams containing inorganic deposits and particulate matter. More specifically, the present invention is directed to an upstream metallic foam trap and a downstream monolithic precious metal catalyst, wherein the trap physically blocks inorganic deposits and particulate matter from poisoning the downstream catalyst. The present invention is also directed to a metallic foam trap containing a coat comprising a first metallic thermal arc sprayed layer and optionally a second refractory metal oxide.

20 Claims, 1 Drawing Sheet

U.S. PATENT DOCUMENTS

| | | | |
|---|---|---|---|
| 4,900,712 A | | 2/1990 | Bar-Ilan et al. |
| 4,985,210 A | | 1/1991 | Minami |
| 5,000,929 A | * | 3/1991 | Horiuchi et al. ........... 423/213.5 |
| 5,100,632 A | | 3/1992 | Dettling et al. |
| 5,204,302 A | | 4/1993 | Gorynin et al. |
| 5,218,817 A | * | 6/1993 | Urata ........................... 60/274 |
| 5,283,041 A | | 2/1994 | Nguyen et al. |
| 5,422,331 A | | 6/1995 | Galligan et al. |
| 5,620,672 A | | 4/1997 | Galligan et al. |
| 5,696,065 A | | 12/1997 | Tanaka et al. |
| 5,721,188 A | | 2/1998 | Sung et al. |
| 5,763,352 A | | 6/1998 | Jung et al. |
| 5,829,248 A | | 11/1998 | Clifton |
| 6,003,305 A | | 12/1999 | Martin et al. |
| 6,047,544 A | | 4/2000 | Yamamoto et al. |
| 6,074,973 A | | 6/2000 | Lampert et al. |
| 6,287,527 B1 | | 9/2001 | Kawanami et al. |
| 6,319,484 B1 | | 11/2001 | Shore et al. |
| 6,559,094 B1 | * | 5/2003 | Korotkikh et al. ........... 502/326 |
| 6,770,252 B2 | | 8/2004 | Cheng |
| 6,773,479 B2 | | 8/2004 | Debenedetti et al. |
| 6,773,481 B2 | | 8/2004 | Noguchi et al. |
| 6,810,660 B2 | | 11/2004 | Hepburn et al. |
| 2001/0027165 A1 | | 10/2001 | Galligan et al. |
| 2002/0128151 A1 | | 9/2002 | Galligan et al. |
| 2003/0165414 A1 | | 9/2003 | Galligan et al. |
| 2004/0009106 A1 | | 1/2004 | Galligan et al. |
| 2004/0038819 A1 | | 2/2004 | Galligan et al. |
| 2004/0087439 A1 | | 5/2004 | Hwang et al. |
| 2004/0219075 A1 | * | 11/2004 | Hepburn et al. ............. 422/171 |
| 2005/0056977 A1 | | 3/2005 | Figoutz et al. |
| 2005/0163677 A1 | | 7/2005 | Galligan et al. |
| 2006/0188422 A1 | * | 8/2006 | Mayer et al. ................. 423/212 |

FOREIGN PATENT DOCUMENTS

| | | | |
|---|---|---|---|
| EP | 749355 B1 | | 12/1996 |
| JP | 193650 | | 8/1987 |
| WO | PCT/US2006/047761 | | 6/2007 |

OTHER PUBLICATIONS

U.S. Appl. No. 11/050,383, "Deflector Plate to Enhance Fluid Stream Contact with a Catalyst", Galligan, Michael, Feb. 3, 2005.

U.S. Appl. No. 11/316,094, "Inlet Metallic Foam Support Coupled to Precious Metal Catalyst for Application on 4 Stroke Platform", Galligan, Michael, Dec. 22, 2005.

Arun D. Jatkar, "A New Catalyst Support Structure For Automotive Catalytic Converters", SAE Technical Paper 971032, Congress and Exposition, Detroit, Michigan, Feb. 24-27, 1997.

Pizzirusso, Joseph F., "The Unique Properties of Polyurethane Foam for Small Engine Filters", SAE 951811, Sep. 13-15, 1997.

Poon, et al., "Fractional Efficiency and Particle Mass Loading Characteristics of Engine Air Filters", SAE 970673, Feb. 24-27, 1997.

Stankiewicz, et al., Properties and Performance of UltraCat(TM) Open-Cell Silicon Carbide Foam Catalyst Substrates, SAE 980669, Feb. 23-26, 1998.

Storey, et al., "Analysis of Semivolatile Organic Compounds in Diesel Exhaust Using a Novel Sorption and Extraction Method", SAE 1999-01-3534, Oct. 25-28, 1999.

Nelson, et al., "Reduction in Emissions and Noise from a 500 cc Snowmobile", SAE 2000-01-2575, Sep. 11-13, 2000.

Zhi, et al., "Development and Experimental Study of a New Diesel Exhaust Particulate Trap System", SAE 2000-01-2846, Oct. 16-19, 2000.

Van Setten, et al., "Molten Salts Supported on Ceramic Foam in the Potential Application of Diesel Soot Abatement Technology", SAE 2001-01-0905, Mar. 5-8, 2001.

Boretto, et al., "Diesel Particulate Filter Based on Ceramic Foams", CNR 1999-24-0052, 4th International Conference on Internal Combustion Engines: Experiments and Modeling, Capri, Naples, Italy, Sep. 12-16, 1999.

* cited by examiner

EXHAUST INLET METALLIC FOAM TRAP COUPLED TO A DOWNSTREAM MONOLITHIC PRECIOUS METAL CATALYST

FIELD OF THE INVENTION

The present invention relates generally to an exhaust treatment system. More specifically, the present invention relates to the use of a metallic foam trap and a three-way catalyst for the treatment of exhaust gases from small engines.

BACKGROUND OF THE INVENTION

The present invention relates to low cost catalytic articles and methods for treating a fluid stream, e.g., a gaseous fluid stream. Among other things, the articles and methods disclosed herein are well suited for converting pollutant components in exhaust streams produced by small engines to innocuous components. The exhaust gases of internal combustion engines, including small engines, are known to contain pollutants such as hydrocarbons, carbon monoxide and nitrogen oxides (NOx) that foul the air.

More stringent emission regulations for devices powered by small internal combustion engines are increasingly being mandated by various regulatory agencies. By small engines, it is meant that the engines, usually two-stroke and four-stroke spark ignition engines, have a displacement of less than about 75 and preferably less than 35 cubic centimeters. Such engines ("utility engines") are found, in particular, in gasoline-engine powered lawn mowers, motorized chain saws, portable generator units, snow blowers, grass/leaf blowers, string mowers, lawn edgers, garden tractors, motor scooters, motorcycles, mopeds, and like devices. Such engines provide a severe environment for a catalytic exhaust treatment apparatus. This is because in small engines, the exhaust gas contains a high concentration of unburned fuel and unconsumed oxygen. Since the users of many of such devices (e.g., motorized saws, lawn mowers, string cutters) work in close proximity to the devices, the concern for reducing the emissions is heightened.

Exhaust treating catalyst articles offer one solution toward reducing emissions from devices powered by small engines. However, practical integration of catalytic articles into such devices can be difficult because the operating conditions for small engines pose difficult design challenges.

First, the catalyst article must be durable. In comparison to devices powered by larger engines (e.g., an automobile), devices powered by smaller engines are less able to absorb and diffuse the vibrations caused by the engine. The vibrational force in a two-stroke engine can be three or four times that of a four-stroke engine. For example, vibrational accelerations of 70 G to 90 G (G=gravitational acceleration) at 150 hertz (Hz) have been reported for small engines. The harsh vibration and exhaust gas temperature conditions associated with small engines lead to several modes of failure in the exhaust gas catalytic treatment apparatus, including failure of the mounting structure by which a catalyst member is secured in the apparatus and consequential damage or destruction of the catalyst member due to the mechanical vibration and to flow fluctuation of the exhaust gas under high temperature conditions. In addition, small engines provide less design flexibility with regard to the placement of the catalytic article. In devices powered by small engines, the close proximity of the catalytic article to the engine exposes the article to intense vibrations. Furthermore, small engines are characterized by high temperature variations as the load on the engine increases and decreases. Accordingly, a catalyst member used to treat the exhaust of a small engine is typically subjected to greater thermal variation and more vibration than the catalytic converter on an automobile, and these conditions have lead to spalling of catalytic material.

Second, the catalytic articles preferably accommodate high flow rates since the majority of small engine platforms exhibit high space velocities due to the limited size of the mufflers employed on these engines. For instance, a small engine having a displacement of 50 cubic centimeters operating with a maximum of 8,000 rpm typically has an exhaust output of 12,000-15,000 L/h. Catalyst articles that significantly restrict the flow rate of the exhaust stream are less desirable since higher backpressures within the exhaust system reduce the engine's operating efficiency. Moreover, as a result of the high flow rate of exhaust stream through the catalyst article, the catalyst composition employed must be highly active and optimally disposed within the article to ensure adequate pollutant conversions.

Third, the catalyst articles are preferably lightweight and occupy small volumes since many of the devices powered by small engines are handheld tools, e.g., weed trimmers, chainsaws. Excessive weight or unwieldy protrusions from such devices negatively restrict the applications that the devices were designed for.

Fourth, the cost of the emissions treatment system cannot significantly increase the overall cost of the device to ensure that the device remains competitive on the marketplace. Small engines typically power moderately priced devices. Accordingly, a need has arisen to design a catalytic article for treating the emissions of devices powered by small engines which meets expected standards, yet minimizes the added cost to the device.

Catalysts useful in small engine applications are described in U.S. Ser. No. 08/682,247, hereby incorporated by reference. Briefly such catalysts comprise one or more platinum group metal compounds or complexes, which can be on a suitable support material. Suitable support materials include refractory oxides such as alumina, silica, titania, silica-alumina, aluminosilicates, aluminum-zirconium oxide, aluminum-chromium oxide, etc. The catalytic materials are typically used in particulate form with particles in the micron-sized range, e.g., 10 to 20 microns in diameter, so that they can be formed into a slurry and applied as a washcoat on a carrier member. Suitable carrier members may be employed, such as a honeycomb-type carrier of the type having a plurality of fine, parallel gas-flow passages extending therethrough from an inlet or an outlet face of the carrier so that the passages are open to fluid-flow therethrough. The coater carrier is disposed in a canister suited to protect the catalyst member and to facilitate establishment of a gas flow path through the catalyst member, as is known in the art.

Emissions requirements have become increasingly stringent, requiring development of both new catalysts and higher catalyst loadings. In addition to absolute emissions standards, emissions control system longevity, i.e. "durability", requirements have also been extended. This maintenance of operation requirement over extended periods has also challenged catalyst development, and has required still further increased catalyst levels. It is primarily the catalyst loading levels, in particular, precious metal loading, which controls the cost of the catalytic converter. Converters that meet all the requirements with a minimum of precious metal loading is a primary objective of catalyst manufacturers.

Numerous reactions can occur during combustion of a hydrocarbon fuel in a variety of temperature and fuel/air stoichiometric environments and the products of such reactions can limit catalyst durability. For example, it was recognized quite early that lead, formerly supplied as an octane booster in fuel as tetraethyl lead, was a serious catalyst poison. The lead octane boosters, thus, have been removed from modern day fuels. However, numerous trace elements still come into contact with the automotive exhaust catalysts, some unavoidably so, and several of these are known to decrease catalyst durability. Not all these poisonous trace elements are derived from the fuel.

For example, zinc dialkyldithiophosphates (ZDDPs) have been long used as antioxidants and/or high-pressure lubricant additives in motor oils. Especially with modern high-speed engines, increased piston/wall clearances and decreased sealing allow increased entry of oil into the combustion chamber, where oil additives, or their combustion byproducts, subsequently pass into the exhaust stream. Such catalytic poisoning is one of the primary obstacles to the durability of low emission catalyst systems. Trace amounts of zinc, phosphorus, calcium, and other elements are put in engine oil as anti-wear additives. The purpose of such additives is to protect engine parts from excessive wear during start-up, when engine oil is not coating the metal components of the engine. However, as the engine burns oil, zinc and phosphorus are exhausted through the catalytic converter, which may accelerate degradation of exhaust catalyst activity. Although the antiwear additives could be removed from the oil, long-term durability of the engine could suffer.

The use of engine anti-wear additives, such as phosphorous and zinc, is described in many references. These additives include compounds such as ZDDPs, also referred to as zinc dithiophosphates (ZDTPs), and zinc dithiocarbamates (ZDTCs). Other disclosed zinc and phosphorous additives to oil include metallic detergents included as extreme pressure agents. Reference is made to U.S. Pat. Nos. 4,674,447 and 5,696,065. The phosphorous and zinc are disclosed as lowering the function of the motor vehicle exhaust treatment catalyst.

Oil additives, such as ZDDP, form an antiwear coating on engine components and act as an antioxidant in the oil. Although engines are designed to minimize the quantity of engine oil exiting the engine via the combustion chamber and exhaust system, it is inevitable that a small fraction of engine oil is released by this mechanism. The ZDDP additive of engine oil deleteriously affects catalytic converters due to phosphorus from the ZDDP interfering with active sites within the catalyst. These phosphorus containing species deposit onto, or react with washcoat components, such as aluminum oxide and cerium oxide, and remain there indefinitely. This phenomenon is commonly referred to as "phosphorus poisoning."

This poisoning mechanism is quite complex, and highly dependent upon the operating temperature, the oil consumption of the engine, and the source of the oil consumption. For example, when oil leaks past the piston rings, and washes into the combustion chamber, the oil goes through the combustion process. This will result in certain types of phosphorus and/or zinc compounds (among other contaminants). Particular compounds may have a particular deactivation effect on the catalytic converter, depending upon the operating condition. On the other hand, oil that leaks past the exhaust valve guide and stem, may not go through the combustion process, and result in a different type of poisoning of the catalytic converter.

Measures to eliminate or reduce ZDDP in engine oils have been investigated. Alternatives to ZDDP have been produced which have been shown to provide antioxidant and antiwear properties similar to ZDDP. However, the ZDDP alternatives are cost prohibitive. Engine oils may be formulated with a lesser amount of ZDDP with the consequences that engine wear and oil oxidation increase, the former limiting engine life and the latter reducing useful oil life.

Another method of removing poisoning inorganic species is through the use of a trap. For example, an upstream foam trap could be used to trap inorganic species from poisoning downstream catalytic converters. U.S. Pat. No. 6,810,660 discloses the use of an exhaust aftertreatment system for an internal combustion engine, which mitigates deleterious poisoning of a catalytic converter by a phosphorous containing species. The system comprises a trap in the exhaust duct located upstream of the catalytic converter. In one embodiment disclosed in the '660 patent, the trap may be a ceramic or metallic foam trap. However, while the '660 patent may suggest in general, the use of a foam trap, the patent does not discuss any specific requirements for the use of such foam traps in small engines.

Foams have been used as catalyst supports. For example, U.S. Pat. No. 4,774,217 discloses a three-dimensional catalytic structure for cleaning exhaust gas from automobiles. According to the '217 patent, the catalytic structure is produced by contacting a ceramic carrier with a catalyst-containing solution and drying the carrier by evaporating the solvent in the solution so that the catalyst is carried at a higher density in the activated alumina layer. The foamed carrier of the '217 patent is made using a polyurethane foam and applying a ceramic material to the surface of the polyurethane foam. The ceramic material is subsequently calcined and coated with a catalyst slurry. However, the ceramic foam of the '217 patent would not survive small engine stresses.

Small engines and motorcycles often require engine oil mixtures that are high in inorganic components for proper engine lubrication. These oils whether applied directly to the fuel or engine components, often make their way to the catalyst. Oil species that include: P, Zn, Ca, Si, Cr, Pb and others are well documented poisons to the catalyst. Furthermore, the catalyst volumes for these systems are small because of muffler design and varying emission requirements and as a result, tend to poison much more rapidly than other applications, such as automotive. Therefore, it is an objective of the present invention to provide a means of removing inorganic compounds from exhaust, thereby preventing catalytic poisoning.

SUMMARY OF THE INVENTION

The inventors have surprisingly found that torturous traps such as metallic foam have great tendency to collect inorganic deposits with higher efficiency compared to other devices that include traditional ceramic and metallic heat exchangers. Straight channel supports often allow inorganic species to bypass a pre catalyst thereby poisoning a precious metal catalyst prematurely in downstream locations.

Accordingly, the present invention comprises an apparatus and method for the purification of an exhaust gas stream from a small engine comprising an upstream metallic foam trap and a downstream monolith precious metal catalyst. More specifically, the present invention relates to the use of a metallic foam trap, which preferentially collects poisonous species primarily in gaseous phase and serves as a physical barrier to the precious metal catalyst downstream.

A further aspect of the present invention relates to a metallic foam trap having a metallic layer deposited thereon by thermal arc spraying, thereby improving trapping efficiency. Optionally a refractory oxide material is coated on the metallic thermal arc sprayed layer to again improve trapping efficiency. The metallic thermal arc sprayed layer in such application is an intermetallic layer or anchor layer and holds the refractory oxide layer in place even under small engine stress.

In yet another aspect of the present invention, the metallic foam trap contains a plurality of skewed channels therethrough in order to relieve exhaust backpressure, which can be large under small engine operation and adversely affect engine performance.

Other objectives and advantages of the present invention will become apparent from the following description and appended claims.

DETAILED DESCRIPTION OF THE INVENTION

Figure 1:
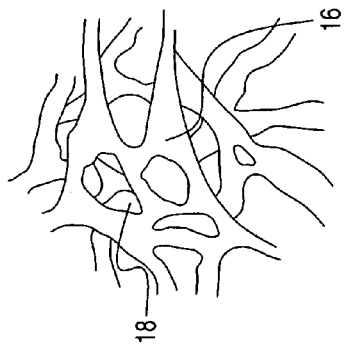
FIG. 1 is a schematic view of an exhaust treatment apparatus in accordance with one embodiment of the present invention employed in the exhaust line of a small engine.

The exhaust treatment apparatus and method of the present invention may be employed in small engines to promote chemical reactions, such as reductions, methanations and especially the oxidation of carbonaceous materials, e.g., carbon monoxide, hydrocarbons, oxygen-containing organic compounds, and the like, to products having a higher weight percentage of oxygen per molecule such as intermediate oxidation products, carbon dioxide and water, the latter two materials being relatively innocuous materials from an air pollution standpoint. The exhaust treatment apparatus can be used to provide removal from gaseous exhaust effluents of uncombusted or partially combusted carbonaceous fuel components such as carbon monoxide, hydrocarbons, and intermediates oxidation products composed primarily of carbon, hydrogen and oxygen, or nitrogen oxides.

Although some oxidation or reduction reactions may occur at relatively low temperatures, they are often conducted at elevated temperatures of, for instance, at least about 150° C., preferably about 200° to 900° C., and generally with the feedstock in the vapor phase. The materials that are subject to oxidation generally contain carbon, and may, therefore, be termed carbonaceous, whether they are organic or inorganic in nature. The catalyst components are thus useful in promoting the oxidation of hydrocarbons, oxygen-containing organic components, and carbon monoxide, and the reduction of nitrogen oxides. These types of materials may be present in exhaust gases from the combustion of carbonaceous fuels, and the catalysts are useful in promoting the oxidation or reduction of materials in such effluents. The exhaust from internal combustion engines operating on hydrocarbon fuels, as well as other waste gases, can be oxidized by contact with the catalyst component and molecular oxygen which may be present in the gas stream as part of the effluent, or may be added as air or other desired form having a greater or lesser oxygen concentration. The products from the oxidation contain a greater weight ratio of oxygen to carbon than in the feed material subjected to oxidation. Many such reaction systems are known in the art.

In one embodiment of the present invention, the catalytic component is a three-way catalyst. Known three-way conversion (TWC) catalysts, which exhibit good activity and long life, comprise one or more platinum group metals (e.g., platinum or palladium, rhodium, ruthenium and iridium) located upon a high surface area refractory oxide support, e.g., a high surface area alumina coating. Other useful refractory oxide supports include metal refractory oxides selected from the group consisting of ceria, silica, zirconia, alumina, titania and mixtures thereof with alumina and titania being most preferred. The support is carried on a suitable carrier or substrate such as a monolithic substrate comprising a refractory ceramic or metal honeycomb structure, or refractory particles such as spheres or short, extruded segments of a suitable refractory material.

A suitable catalytic material for use as the catalyst in accordance with this invention can be prepared by dispersing a compound and/or complex of any catalytically active component, e.g., one or more platinum group metal compounds or complexes, onto relatively inert bulk support material. As used herein, the term "compound", as in "platinum group metal compound" means any compound, complex, or the like of a catalytically active component (or "catalytic component") which, upon calcination or upon use of the catalyst, decomposes or otherwise converts to a catalytically active form, which is often, but not necessarily, an oxide. The compounds or complexes of one or more catalytic components may be dissolved or suspended in any liquid which will wet or impregnate the support material, which does not adversely react with other components of the catalytic material and which is capable of being removed from the catalyst by volatilization or decomposition upon heating and/or the application of a vacuum. Generally, both from the point of view of economics and environmental aspects, aqueous solutions of soluble compounds or complexes are preferred. For example, suitable water-soluble platinum group metal compounds are chloroplatinic acid, rhodium chloride, rhodium nitrate, hexamine rhodium chloride, palladium nitrate or palladium chloride, etc. The compound-containing liquid is impregnated into the pores of the bulk support particles of the catalyst, and the impregnated material is dried and preferably calcined to remove the liquid and bind the platinum group metal into the support material. In some cases, the completion of removal of the liquid (which may be present as, e.g., water of crystallization) may not occur until the catalyst is placed into use and subjected to the high temperature exhaust gas. During the calcination step, or at least during the initial phase of use of the catalyst, such compounds are converted into a catalytically active form of the platinum group metal or a compound thereof. An analogous approach can be taken to incorporate the other components into the catalytic material. Optionally, the inert support materials may be omitted and the catalytic material may consist essentially of the catalytic component deposited directly on the sprayed carrier substrate by conventional methods.

A typical catalytic material for use on a catalyst member for a small engine comprises platinum, palladium and rhodium dispersed on an alumina and further comprises oxides of neodymium, strontium, lanthanum, barium and zirconium. In one embodiment, a catalytic material comprises a first refractory component and at least one first platinum group component, preferably a first palladium component and optionally, at least one first platinum group metal component other than palladium, an oxygen storage component which is preferably in intimate contact with the platinum group metal component in the first layer. An oxygen storage component ("OSC") effectively absorbs excess oxygen during periods of lean engine operation and releases oxygen during periods of fuel-rich engine operation and thus ameliorates the variations in the oxygen/hydrocarbon stoichiometry of the exhaust gas stream due to changes in engine operation between a fuel-rich operation mode and a lean (i.e., excess oxygen) operation mode. Bulk ceria is known for use as a OSC, but other rare earth oxides may be used as well. In addition, a co-formed rare earth oxide-zirconia may be employed as a OSC. The co-formed rare earth oxide-zirconia may be made by any suitable technique such as co-precipitation, co-gelling or the like. One suitable technique for making a co-formed ceria-zirconia material is illustrated in the article by Luccini, E., Mariani, S., and Sbaizero, O. (1989) "Preparation of Zirconia Cerium Carbonate in Water with Urea" Int. J. of Materials and Product Technology, vol. 4, no. 2, pp. 167-175, the disclosure of which is incorporated herein by reference. As disclosed starting at page 169 of the article, a dilute (0.1 M) distilled water solution of zirconyl chloride and cerium nitrate in proportions to promote a final product of $ZrO_2$ – 10 mol % $CeO_2$ is prepared with ammonium nitrate as a buffer, to control pH. The solution was boiled with constant stirring for two hours and complete precipitation was attained with the pH not exceeding 6.5 at any stage.

Catalyst compositions can be coated onto a suitable substrate. The coated catalyst when applied to the substrate in a slurry or liquid form is referred to as a washcoat. The catalyst of the instant invention may be used in any configuration, shape or size, which exposes it to the gas to be treated. For example, the catalyst can be conveniently employed in particulate form or the catalyst can be deposited onto a solid monolithic carrier, e.g. a honeycomb monolith.

Exhaust gaseous emissions comprising hydrocarbons, carbon monoxide, nitrogen oxides, and sulfur oxides, which also contain oil additives (as previously discussed), tend to poison three-way conversion catalysts. The poisons may accumulate on the surface of the washcoat, creating a physical barrier, or they may interact with the catalytic material in the washcoat, resulting in loss of catalytic activity. The poison level and type can vary, depending upon the design of the engine and the operating conditions.

Therefore, the present invention is directed to an improved apparatus and method for treating exhaust gas streams, such as small engine exhaust gas streams, in order to reduce or minimize the poisoning of exhaust catalysts by inorganic components. More specifically, the present invention employs an upstream metallic foam trap, to physically trap and thereby prevent inorganic deposits and particulate matter from poisoning downstream catalysts.

The apparatus of the present invention comprises an upstream metallic foam trap and a separate downstream catalytic component, e.g. a three-way catalyst. In another embodiment, the metallic foam trap and the catalytic component can be fused together by welding, diffusion bonding or other means to constitute a single emission control unit.

The apparatus of the present invention may be more readily appreciated by reference to FIG. 1, which depicts a schematic view of an exhaust flow apparatus, which can be employed in the exhaust line of a small engine, one non-limiting embodiment of the invention. Referring to FIG. 1, the apparatus comprises: an exhaust inlet pipe 2, a housing unit 4, and an exhaust outlet pipe 6. The housing unit 4 in turn comprises an upstream metallic foam trap 8, and a downstream monolithic support 10 containing one or more precious metal catalysts useful for the break down of engine exhaust components such as hydrocarbons, as previously discussed. The upstream metallic foam trap 8, comprises an open network of metallic cells or pores consisting of struts for the cellular walls, which preferentially collects poisonous species such as P, Zn, Ca, Si, Cr, Pb, and others, primarily in gaseous phase and serves as a physical barrier to the downstream monolithic precious metal catalyst, see FIG. 2a and FIG. 2b.

The method of the present invention comprises directing an exhaust gas stream from a small engine through an exhaust treatment apparatus comprising an upstream metallic foam trap, which acts as a physically barrier to inorganic deposits and particulate matter contained in the exhaust gas streams, such as, for example from fuel or oil additives, and a downstream catalyst, such as a typical three-way catalyst as described above.

As used herein and in the appended claims, the terms "upstream" and "downstream" refer to relative directions according to the flow of an engine exhaust gas stream, which typically comprises combustion products, products of incomplete combustion, oxides of nitrogen, combustible and/or carbonaceous particulate matter (soot), and un-reacted oxygen and nitrogen. It is understood that the particulate matter may contain both combustible and non-combustible constituents, e.g. from fuel or oil additives which are typically added in higher amounts in small engines. The term "stream," as used in this specification and appended claims, broadly refers to any combination of flowing gas that may contain solid or liquid particulate matter. The term "gaseous stream" or "exhaust gas stream" means a stream of gaseous constituents, such as the exhaust of an internal combustion engine, which may contain entrained non-gaseous components such as liquid droplets, solid particulates, and the like.

Figure 2A:
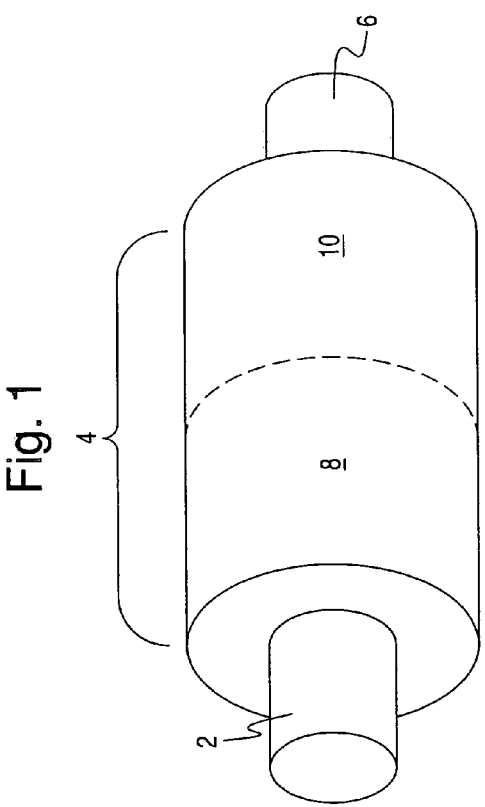
FIG. 2a is a pictorial sectional view illustrating the general configuration of a metallic foam trap in accordance with one embodiment of the present invention.
Figure 2B:
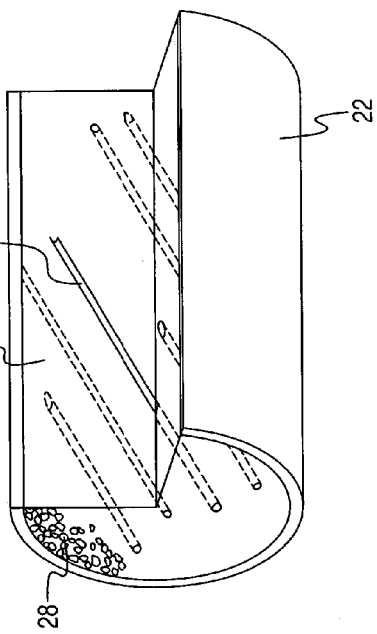
FIG. 2b is an enlarged schematic fragmental view of the three-dimensional network of the metallic foam trap.

The metallic foam substrate of the present invention forms an open or reticulated substrate structure comprising metallic cells or pores consisting of struts for the cellular walls, see FIG. 2b. The metallic foam substrate can be further described as a porous matrix having a plurality of irregularly shaped passages wherein exhaust gases undergo multiple random twists and turns in traveling from the upstream side to the downstream side of the trap, see FIG. 2a. This turbulent or tortuous flow path is defined by numerous apertures, pores, channels or similar structural features that cause liquid and/or gas to flow therethrough in turbulent or substantially non-laminar fashion and give the substrate a high surface area per overall volume of the flow path of the fluid through the substrate, e.g., features that create a high mass transfer zone for the fluid therein. In contrast, a dense substrate, such as a plate, tube, foil and the like, has a relatively small surface area per overall volume of the flow path through the substrate regardless of whether it is perforated or not, and do not substantially disrupt laminar flow therethrough. The open or reticulated substrate structure of the metallic foam, importantly not only provides a high mass transfer zone, but such open structure reduces the backpressure.

The metallic foam trap of the present invention may be more readily appreciated by reference again to FIG. 2a, which depicts a schematic perspective view of a metallic foam trap, and FIG. 2b, which depicts an enlarged schematic fragmental view of the three-dimensional network of the metallic foam trap, both non-limiting embodiments of the invention. Referring to FIG. 2a and b, a metallic foam trap 12 is housed within a housing unit 14. The figure shows an open network of metallic struts 16 and pores 18, which makes up a torturous pathway for an engine exhaust gas stream. The metallic foam preferentially collects poisonous species primarily in the gaseous phase and serves as a physical barrier to prevent poisonous species from contacting the downstream monolithic precious metal catalyst.

Since these metallic foam structures have higher surface areas than dense substrates and since they permit fluid flow therethrough, they are well-suited for use in preparing trap members for the trapping of liquid- or gas-borne materials.

Furthermore, the high surface area provides for improved mass transfer of active species thereby improving the efficiency of the metallic foam trap.

Methods for making foamed metal are known in the art, see e.g., U.S. Pat. No. 3,111,396, which is incorporated herein by reference, and the use of foamed metal as a carrier for a catalytic material has been suggested in the art, see e.g., SAE Technical Paper 971032, entitled "A New Catalyst Support Structure For Automotive Catalytic Converters" by Arun D. Jatkar, which was presented at the International Congress and Exposition, Detroit, Mich., Feb. 24-27, 1997, and Pestryakov et al., Journal of Advanced Materials, 1(5), 471-476 (1994). Metallic foams can be characterized in various ways, some of which relate to the properties of the initial organic matrix about which the metal is disposed. Some characteristics of foamed metal substrates recognized in the art include cell size, density, free volume, and specific surface area. For example, the surface area may be 1500 times that of a solid substrate having the same dimensions as the foamed substrate. As mentioned by Pestryakov et al, foamed metal substrates useful as carriers for catalyst members may have mean cell diameters in the range of 0.5 to 5 mm, and they may have a free volume of from about 80 to 98%, e.g., 3 to 15 percent of the volume occupied by the foamed substrate may constitute metal. The porosity of the substrate may range from 3 to 80 pores per inch (ppi), e.g., from 3 to 30 ppi, or from 3 to 10 ppi, or from 3 to 5 ppi. In an illustrative range of 10 to 80 ppi, other characteristics such as cells per square inch may range from 100 to 6400 and the approximate web diameter may vary from 0.01 inch to 0.004 inch. Such foams may have open-cell reticulated structures, based on a reticulated/interconnected web precursor. They typically have surface areas that increase with porosity in the range of from about 700 square meters per cubic foot of foam (m$^2$/ft$^3$) at about 10 ppi to 4000 m$^2$/ft$^3$ at about 60 ppi, etc. Other suitable metallic foamed substrates have surface areas ranging from about 200 square feet per cubic foot of foamed metal (ft$^2$/ft$^3$) at about 10 ppi to about 1900 ft$^2$/ft$^3$ at about 80 ppi. One such substrate has a specific weight of 500 g/m at a thickness of about 1.6+/−0.2 millimeters with a porosity of 110 ppi. They may have volume densities in the range of 0.1 to 1 grams per cubic centimeter (g/cc), 0.1 to 0.3 is also exemplified.

Metallic foamed substrates can be formed from a variety of metals, including iron, titanium, tantalum, tungsten noble metals, common sinterable metals such as copper, nickel, bronze, etc., aluminum, zirconium, etc., and combinations and alloys thereof such as steel, stainless steel, Hastalloy, Ni/Cr, Inconel (nickel/chromium/iron), Monel (nickel/copper), and Fecralloy (iron/chromium/aluminum/yttrium). In one embodiment, the metallic foam substrate is selected from the group consisting of stainless steel, titanium, Fecralloy, aluminum zirconate, aluminum titanate, aluminum phosphate, cordierite, mullite and corundum. In another embodiment, Fecralloy (FeCrAlY) is exemplified. A suitable metallic foam substrate for use with the present invention has a volume occupied by the foamed substrate of about 3 percent to about 10 percent. From about 6 to about 8 percent is also exemplified.

The metallic foam trap is preferably coated with a high-surface area component, said component comprising a pretreatment metallic thermal arc sprayed layer and optionally a washcoat layer, such as aluminum oxide, cerium oxide, and zirconium oxide. The metallic thermal arc sprayed layer coating can be useful to facilitate the adhesion of the washcoat layer. The metallic thermal arc sprayed layer of the present invention can be applied with a thermal spraying process in general, including plasma spraying, single wire plasma spraying, high velocity oxy-fuel spraying, combustion wire and/or powder spraying, electric arc spraying, etc.

In one aspect of the present invention, electric arc spraying, e.g., twin wire arc spraying, of a metal (which term, as used herein and in the claims, includes mixtures of metals, including without limitation, metal alloys, pseudoalloys, and other intermetallic combinations) onto metallic foam substrate yields a structure having unexpectedly superior utility as a substrate for a washcoat layer, e.g., a refractory metal oxide. Twin wire arc spraying (encompassed herein by the term "wire arc spraying" and by the broader term "electric arc spraying") is a known process, see e.g., U.S. Pat. No. 4,027,367, which is incorporated herein by reference. Briefly described, in the twin wire arc spray process, two feedstock wires act as two consumable electrodes. These wires are insulated from each other as they are fed to the spray nozzle of a spray gun in a fashion similar to wire flame guns. The wires meet in the center of a gas stream generated in the nozzle. An electric arc is initiated between the wires, and the current flowing through the wires causes their tips to melt. A compressed atomizing gas, usually air, is directed through the nozzle and across the arc zone, shearing off the molten droplets to form a spray that is propelled onto the substrate. Only metal wire feedstock can be used in an arc spray system because the feedstock must be conductive. The high particle temperatures created by the spray gun produce minute weld zones at the impact point on a metallic substrate. As a result, such electric arc spray coatings (sometimes referred to herein as "anchor layers") have good cohesive strength and a very good adhesive bond to the substrate.

Thermal arc sprayed layers of a variety of compositions can be deposited on a metallic foam substrate in accordance with the present invention by utilizing, without limitation, feedstocks of the following metals and metal mixtures: Ni, Ni/Al, Ni/Cr, Ni/Cr/Al/Y, Co/Cr, Co/Cr/Al/Y, Co/Ni/Cr/Al/Y, Fe/Al, Fe/Cr, Fe/Cr/Al, Fe/Cr/Al/Y, Fe/Ni/Al, Fe/Ni/Cr, 300 and 400 series stainless steels, and, optionally, mixtures of one or more thereof. In one embodiment, the metallic thermal arc sprayed layer may comprise nickel and aluminum. The aluminum may comprise from about 3 to 10 percent, optionally from about 6 to 8 percent, of the combined weight of nickel and aluminum in the metallic thermal arc sprayed layer.

In one embodiment of the present invention, a high surface area temperature resistant refractory layer can be coated onto a metallic thermal arc sprayed layer. Useful high surface area refractory layers include one or more refractory oxides. These oxides include, for example, silica and metal oxides such as alumina, including mixed oxide forms such as silica-alumina, aluminosilicates which may be amorphous or crystalline, alumina-zirconia, alumina-chromia, alumina-ceria and the like. In another embodiment, the support may be substantially comprised of alumina which preferably includes the members of the gamma or activated alumina family, such as gamma and eta aluminas, and, if present, a minor amount of other refractory oxide, e.g., about up to 20 weight percent. Desirably, the active alumina has a specific surface area of 30 to 300 m$^2$/g.

Other suitable materials for the refractory metal oxide layer include alumina, silica, titania, titania-alumina, silica-alumina, alumino-silicates, zirconia, titania-zirconia, aluminum-zirconium oxide, aluminum-chromium oxide, baria-alumina, etc. Such materials are preferably used in their high surface area forms. For example, gamma-alumina is preferred over alpha-alumina. Alternatively, the refractory layer may be made of any suitable refractory materials such as cordierite, cordierite-alpha-alumina, silicon nitride, zirconium mullite, spodumene, alumina-silica magnesia, zirconium silicate, sillimanite, magnesium silicates, zirconium oxide, petallite, alpha-alumina and alumino-silicates. In one embodiment of the present invention the refractory layer may be selected from the group consisting of refractory oxides such as alumina, titania, zirconia, zirconia-alumina, zirconia-titania, titania-alumina, lanthana-alumina, baria-zirconia-alumina, niobia-alumina, and silica-leached cordierite.

The refractory metal oxide layer is preferably porous in nature and has a high surface area such as alumina, preferably gamma-alumina. The choice of the support material is not critical to the invention. Desirably, the refractory metal oxide support will have a surface area of between about 5 and about 350 m$^2$/g. Typically, the support will be present in the amount of about 1.5 to about 5.0 g/in$^3$, preferably 2 to 4 g/in$^3$.

Although catalysts are generally ill-suited for use with gases containing inorganic compounds and/or unused hydrocarbons (as described above), a catalyst may optionally be employed on the metallic foam. The catalyst may be any known catalyst for the break down of exhaust gases, as discussed hereinabove. Such catalysts, and methods of preparation, are discussed hereinabove. In one embodiment, the catalyst may be employed in the downstream half of the metallic foam trap to prevent substantial poisoning thereof.

In yet another embodiment, the metallic foam trap of the invention contains at least one perforated skewed channel therethrough to relieve backpressure. The perforated skewed channel(s) can be literally drilled directly through the metallic foam at an angle thereby allowing the exhaust gas stream to mix between the outer and inner confines passing through the pipe, without compromising the efficiency of the metallic foam trap. This open structure through the metallic foam relieves exhaust gas stream backpressure.

Figure 3:
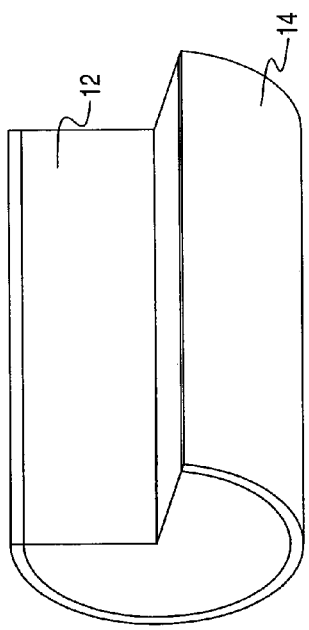
FIG. 3 is a pictorial sectional view of an alternative configuration of a metallic foam trap, in accordance with an embodiment of the present invention.

The apparatus of the present invention may be more readily appreciated by reference to FIG. 3, which depicts a schematic perspective view of a metallic foam trap, one non-limiting embodiment of the invention. Referring to FIG. 3, the metallic foam trap 20 is housed within a housing unit 22 and contains a plurality of perforated skewed channels 24 running therethrough. The perforated skewed channels 24 run at an angle relative to the longitudinal axis of trap 20 thereby allowing the exhaust gas stream to mix between the outer and inner confines passing through the pipe, without compromising the efficiency of the metallic foam trap. Channels 24 do not alter in any significant manner the tortuous pathway created by the metallic foam. The perforated skewed channels 24 relieve backpressure. The schematic shows an open network of pores 28 which along with the metallic struts (not shown), see FIG. 2b, comprise a torturous pathway for an engine exhaust gas stream as described above. The struts can be coated with a metallic thermal arc sprayed layer and optionally a high surface area temperature resistant metal oxide, which preferentially collects poisonous species primarily in the gaseous phase and serves as a physical barrier to the downstream monolithic precious metal catalyst.

The exhaust treatment apparatus of this invention is well-suited for use in the treatment of the exhaust of small engines, especially two-stroke and four-stroke engines, because of the superior adherence of the metallic thermal arc sprayed layer and optionally a refractory metal oxide to the metallic foam substrate. The exhaust treatment apparatus associated with a small engine is subjected to significantly different operating conditions from those experienced by the catalytic converters for automobiles or other large engine machines. This is because the devices with which smaller engines are powered are commensurately smaller than those powered by larger engines, e.g., a typical use for a small engine is to drive a lawn mower, whereas a larger engine will power, e.g., an automobile. Small engines are also employed in vehicles such as motorcycles, motor bikes, snow mobiles, jet skis, power boat engines, etc., and as utility engines for chain saws, blowers of snow, grass and leaves, string mowers, lawn edgers, garden tractors, generators, etc. Such smaller devices are less able to absorb and diffuse the vibrations caused by the engine, and they provide less design flexibility with regard to the placement of the exhaust treatment apparatus. Because of the close proximity of the exhaust treatment apparatus to a small engine, the metallic foam and catalyst component are subjected to intense vibrations. In addition, although the small mass of the engine allows for rapid cooling of the exhaust gases, small engines are characterized by high temperature variations as the load on the engine increases and decreases. Accordingly, an exhaust treatment apparatus used to treat the exhaust of a small engine is typically subjected to greater thermal variation and more vibration than the catalytic converter on an automobile, and these conditions have lead to spalling of catalytic material from prior art catalyst members. This problem is believed to be heightened in devices for the treatment of motorcycle exhaust because the combustion of fuel in each cycle of a motorcycle engine is believed to generate an explosion that sends a shock wave through the exhaust gas. The shock waves impose periodic stresses on the catalyst member in addition to the heat and vibrations common to other small engines, increasing the need for a strong bond of catalytic material to the substrate and therefore making a catalyst member as provided by this invention especially advantageous.

What is claimed is:

1. An exhaust treatment apparatus comprising:
   (a) an upstream metallic foam trap, wherein said metallic foam contains a coat comprising a metallic thermal arc sprayed layer and wherein a catalyst for the breakdown of exhaust gases is not employed on said metallic foam; and
   (b) a downstream precious metal catalyst.

2. The exhaust treatment apparatus of claim 1, wherein said metallic thermal arc sprayed layer is selected from the group consisting of Ni, Ni/Al, Ni/Cr, Ni/Cr/Al/Y, Co/Cr, Co/Cr/Al/Y, Co/Ni/Cr/Al/Y, Fe/Al, Fe/Cr, Fe/Cr/Al, Fe/Cr/Al/Y, Fe/Ni/Al, Fe/Ni/Cr, 300 and 400 series stainless steels.

3. The exhaust treatment apparatus of claim 1, wherein said metallic foam is selected from the group consisting of stainless steel, titanium, Fecralloy, aluminum zirconate, aluminum titanate, aluminum phosphate, cordierite, mullite and corundum.

4. The exhaust treatment apparatus of claim 1, wherein said metallic foam is coated with said metallic thermal arc sprayed layer and a refractory oxide layer.

5. The exhaust treatment apparatus of claim 4, wherein said refractory oxide layer includes one or more refractory oxides selected from the group consisting of alumina, gamma-alumina, titania, zirconia, zirconia-alumina, zirconia-titania, titania-alumina, lanthana-alumina, baria-zirconia-alumina, niobia-alumina, and silica-leached cordierite.

6. An exhaust treatment apparatus comprising:
   (a) an upstream Fecralloy foam trap, wherein a catalyst for the breakdown of exhaust gases is not employed on said metallic foam; and
   (b) a downstream precious metal catalyst.

7. The exhaust treatment apparatus of claim 6, wherein said metallic foam is coated with a metallic thermal arc sprayed layer.

8. The exhaust treatment apparatus of claim 7, wherein said metallic thermal arc sprayed layer is selected from the group consisting of Ni, Ni/Al, Ni/Cr, Ni/Cr/Al/Y, Co/Cr, Co/Cr/Al/Y, Co/Ni/Cr/Al/Y, Fe/Al, Fe/Cr, Fe/Cr/Al, Fe/Cr/Al/Y, Fe/Ni/Al, Fe/Ni/Cr, 300 and 400 series stainless steels.

9. The exhaust treatment apparatus of claim 8, wherein said metallic thermal arc sprayed layer is coated with a refractory oxide layer, wherein said refractory oxide layer includes one or more refractory oxides selected from the group consisting of alumina, gamma-alumina, titania, zirconia, zirconia-alumina, zirconia-titania, titania-alumina, lanthana-alumina, baria-zirconia-alumina, niobia-alumina, and silica-leached cordierite.

10. An exhaust treatment apparatus comprising:
    (a) an upstream metallic foam trap said foam trap containing at least one perforated skewed channel therethrough; and
    (b) a downstream precious metal catalyst.

11. The exhaust treatment apparatus of claim 10, wherein said metallic foam is selected from the group consisting of stainless steel, titanium, Fecralloy, aluminum zirconate, aluminum titanate, aluminum phosphate, cordierite, mullite and corundum.

12. The exhaust treatment apparatus of claim 11, wherein said metallic foam trap is a Fecralloy foam trap.

13. The exhaust apparatus of claim 10, wherein said metallic foam trap is coated with a metallic thermal arc sprayed layer selected from the group consisting of Ni, Ni/Al, Ni/Cr, Ni/Cr/Al/Y, Co/Cr, Co/Cr/Al/Y, Co/Ni/Cr/Al/Y, Fe/Al, Fe/Cr, Fe/Cr/Al, Fe/Cr/Al/Y, Fe/Ni/Al, Fe/Ni/Cr, 300 and 400 series stainless steels.

14. The exhaust treatment apparatus of claim 13, wherein said metallic foam is coated with said metallic thermal arc sprayed layer and a refractory oxide layer.

15. The exhaust treatment apparatus of claim 14, wherein said refractory oxide layer includes one or more refractory oxides selected from the group consisting of alumina, gamma-alumina, titania, zirconia, zirconia-alumina, zirconia-titania, titania-alumina, lanthana-alumina, baria-zirconia-alumina, niobia-alumina, and silica-leached cordierite.

16. A method of minimizing poisoning of small engine exhaust catalysts, said method comprising:
    (a) providing an exhaust flow apparatus comprising:
        (i) an upstream metallic foam trap containing a coat comprising a metallic thermal arc sprayed layer, wherein said trap physically traps exhaust stream components, which may be poisonous to downstream precious metal catalysts; and
        (ii) at least one downstream precious metal catalyst for breaking down exhaust gases; and
    (b) directing the engine exhaust stream through said apparatus.

17. The method of claim 16, wherein said metallic foam is selected from the group consisting of stainless steel, titanium, Fecralloy, aluminum zirconate, aluminum titanate, aluminum phosphate, cordierite, mullite and corundum.

18. The method of claim 16, wherein said metallic foam trap is coated with a metallic thermal arc sprayed layer selected from the group consisting of Ni, Ni/Al, Ni/Cr, Ni/Cr/Al/Y, Co/Cr, Co/Cr/Al/Y, Co/Ni/Cr/Al/Y, Fe/Al, Fe/Cr, Fe/Cr/Al, Fe/Cr/Al/Y, Fe/Ni/Al, Fe/Ni/Cr, 300 and 400 series stainless steels.

19. The method of claim 18, wherein said metallic thermal arc sprayed layer is coated with a refractory oxide layer, wherein said refractory oxide layer includes one or more refractory oxides is selected from the group consisting of alumina, gamma-alumina, titania, zirconia, zirconia-alumina, zirconia-titania, titania-alumina, lanthana-alumina, baria-zirconia-alumina, niobia-alumina, and silica-leached cordierite.

20. The method of claim 16, wherein a catalyst for the breakdown of exhaust gases is not employed on said metallic foam.

* * * * *